United States Patent Office.

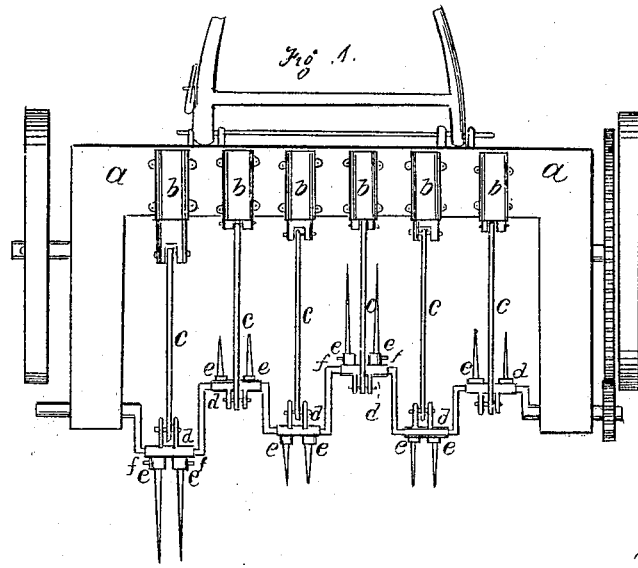
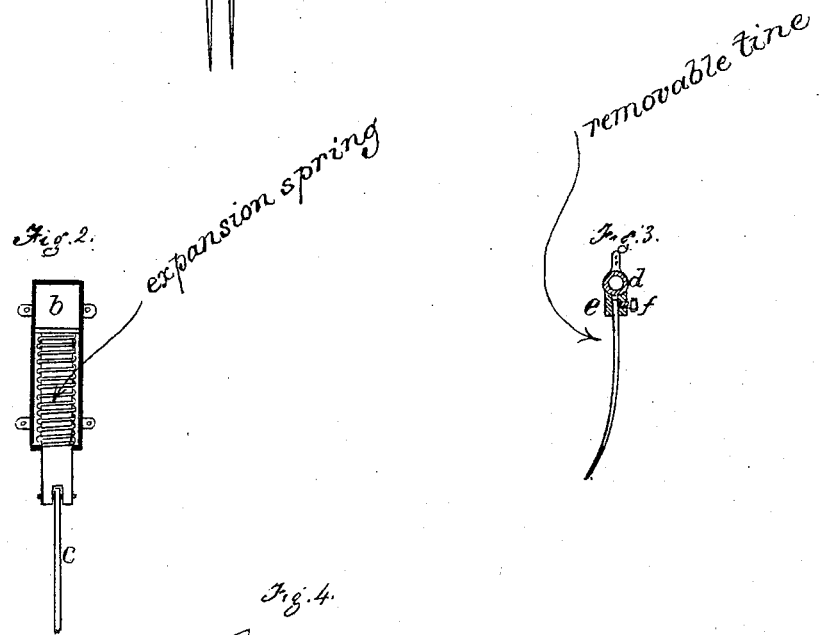
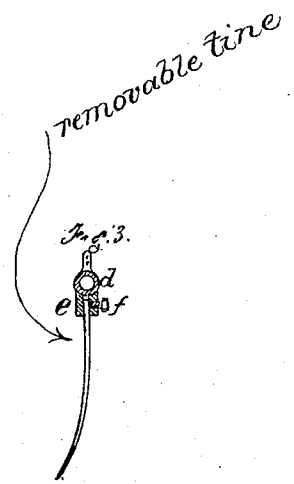
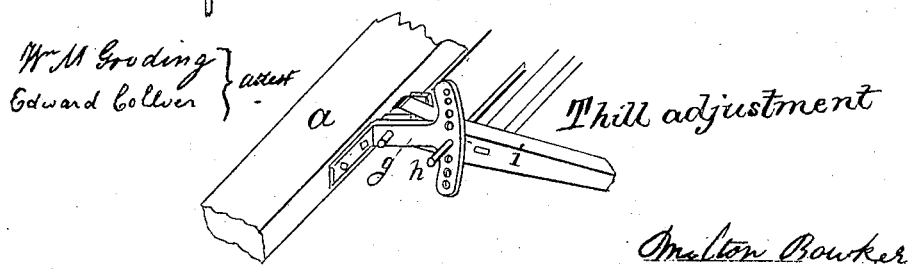

MILTON BOWKER, OF NEWARK, NEW JERSEY.

Letters Patent No. 95,875, dated October 19, 1869; antedated October 9, 1869.

IMPROVEMENT IN HAY-SPREADERS.

The Schedule referred to in these Letters Patent and making part of the same.

*To all whom it may concern:*

Be it known that I, MILTON BOWKER, of the city of Newark, in the county of Essex, and State of New Jersey, have invented certain Improvements in Machines for Spreading Hay; and I declare the following, when taken in connection with the accompanying drawings, to be a full, clear, and exact description of the same.

The nature of my improvements consists in a peculiarly-formed sleeve upon the cranks, and in the manner of securing the tines of the forks thereto, and in a peculiar provision for preventing the breaking of the tines when encountering stones or stumps.

In the drawings—

Figure 1 is a bird's-eye view of a hay-spreader.

Figure 2 is a sectional view of the cylinder, piston, and spring, provided for contingencies hereinafter specified.

Figure 3 is an end view of a sleeve, with socket and set-screw, for holding the fork-tines.

Figure 4 is a provision for adjustable thills.

The same letters refer to the same parts in each figure.

Upon the front bar $a$, of the main frame of the machine, I place a cylinder, $b$, for each fork, opposite the middle of each crank.

Each cylinder has a spiral spring, of the needed stiffness, wound around a piston, drawing it back with sufficient force to throw the hay backward from the fork-tines, some distance, as the machine turns the cranks in moving forward.

The pistons and springs are of sufficient length to allow the forks being pressed back in passing over a stump or stone, instantly restoring its working position when the obstacle is passed. (See fig. 2.)

A rod, $c$, connects the pistons with the sleeve $d$. The connection being at a point nearer the centre of the circle than the extremities of the cranks, of course prevents the sleeve from revolving, while a back-and-forward motion is thereby given to the forks, and it lifts them over the hay in their return, bringing them down, in their sweep, toward the back of the machine.

Sockets, $e$, are attached to each sleeve, into which the fork-tines are fitted, being held therein by the set-screws $f$.

Extra tines being provided, an accidental breakage of a tine can be remedied in the field, with but little delay.

To provide for varying heights in the animals used in working the machine, a strong plate, $g$, is firmly bolted to the front bar $a$, in which is a series of holes, through which a bar, $h$, is passed, holding the thills $i$ at the required height to carry the machine along at the needed distance of the fork-tines from the ground. (See fig. 4.)

What I claim as my improvement, and desire to secure by Letters Patent, is—

1. The cylinders, pistons, and springs, constructed, combined, and arranged upon a hay-spreader, substantially as specified and shown.

2. The sleeves $d$, when constructed with the sockets $e$ and set-screws $f$, in the manner and for the purpose herein described.

3. The adjusting-plate $g$, when used in combination with the cylinders, pistons, and springs, and the sleeves $d$, in constructing a machine to spread hay.

4. The combination of the connecting-rod $g$, the sleeve $d$, and the tines and set-screws $f$, substantially as specified and shown.

MILTON BOWKER.

Witnesses:
WM. M. GOODING,
EDWARD COLLYER.